US012782636B2

(12) United States Patent
Puckett et al.

(10) Patent No.: US 12,782,636 B2
(45) Date of Patent: Nov. 3, 2026

(54) ADAPTIVE MODAL PHASE MATCHING IN WAVEGUIDES FOR INCREASED NONLINEAR CONVERSION EFFICIENCY

(71) Applicant: Honeywell International Inc., Charlotte, NC (US)

(72) Inventors: Matthew Wade Puckett, Phoenix, AZ (US); Chad Fertig, Roseville, MN (US); Jad Salman, Wayzata, MN (US); Luke Horstman, Saint Louis Park, MN (US); Wei Charles Jiang, Vestal, NY (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 265 days.

(21) Appl. No.: 18/600,141

(22) Filed: Mar. 8, 2024

(65) Prior Publication Data

US 2025/0284057 A1 Sep. 11, 2025

(51) Int. Cl.
*G02B 6/13* (2006.01)
*G02B 27/00* (2006.01)

(52) U.S. Cl.
CPC ........... *G02B 6/13* (2013.01); *G02B 27/0012* (2013.01)

(58) Field of Classification Search
CPC ................................. G02F 1/365; G02F 1/377
See application file for complete search history.

(56) References Cited

U.S. PATENT DOCUMENTS

| | | | | |
|---|---|---|---|---|
| 5,046,803 | A * | 9/1991 | Colak | G02F 1/377 359/328 |
| 5,048,905 | A | 9/1991 | Fejer et al. | |
| 5,131,068 | A | 7/1992 | Kanarian et al. | |
| 5,489,984 | A | 2/1996 | Hariharan et al. | |
| 6,836,324 | B2 | 12/2004 | Scheiner et al. | |
| 7,110,900 | B2 | 9/2006 | Adler et al. | |
| 11,215,758 | B1 * | 1/2022 | Dalvand | G02B 6/136 |
| 11,874,496 | B2 * | 1/2024 | Ravi | G02B 6/13 |
| 12,140,796 | B2 * | 11/2024 | Hsu | G02B 6/136 |
| 2007/0297732 | A1 | 12/2007 | Mason et al. | |
| 2018/0031949 | A1 | 2/2018 | Mookherjea et al. | |
| 2018/0299617 | A1 * | 10/2018 | Ticknor | G02B 6/125 |

(Continued)

OTHER PUBLICATIONS

Chen et al, "Adapted poling to break the nonlinear efficiency limit in nanophotonic lithium niobate waveguides", Physics Optics, Jul. 21, 2023, pp. 1 through 10.

(Continued)

*Primary Examiner* — Rhonda S Peace
(74) *Attorney, Agent, or Firm* — Fogg & Powers LLC

(57) ABSTRACT

To fabricate a waveguide with improved light coupling efficiency utilizing second order nonlinear optical coupling processes, localized thickness variations of at least one waveguide layer are first measured instead of assuming a constant thickness. Such localized thickness variations can change the phase matching condition needed to propagate light in the waveguide, thereby reducing efficiency of a waveguide. The width of the waveguide is then fabricated based on the localized thickness variations in order to achieve a desired modal phase matching condition, for example, by finite element modeling. In doing so, the waveguide can improve light coupling efficiency by compensating for localized thickness variations during the fabrication process.

17 Claims, 5 Drawing Sheets

(56) References Cited

U.S. PATENT DOCUMENTS

| | | | | |
|---|---|---|---|---|
| 2022/0107547 | A1* | 4/2022 | Yap | G02F 1/377 |
| 2025/0284057 | A1* | 9/2025 | Puckett | G02B 6/13 |
| 2025/0298191 | A1* | 9/2025 | Jiang | G02B 6/1228 |

OTHER PUBLICATIONS

Hansen et al., "Efficient and robust second-harmonic generation in thin-film lithium niobate using modal phase matching", Physics Optics, Nov. 24, 2023, pp. 1 through 11.

Li et al., Advancing large-scale thin-film PPLN nonlinear photonics with segmented tunable micro-heaters, Physics Optics, Dec. 15, 2023, pp. 1 through 6.

Wang, "Ultrahigh-efficiency second-harmonic generation in nanophotonics PPLN waveguides", Applied Physics, Sep. 24, 2018, pp. 1 through 5.

Zhao et al., "Unveiling the origins of quasi-phase matching spectral imperfections in thin-film lithium niobate frequency doublers", APL Photonics, vol. 8, Issue 12, Dec. 2023, pp. 1 through 22.

Degl, Innocenti et al. "Micromachining of ridge optical waveguides on top of He'-implanted B-BaB204 crystals by femtosecond laser ablation", Journall of Applied Physics, vol. 100, 113121 (2006), pp. 113121-1 through 113121-5.

European Patent Office, "Extended European Search Report", dated Jun. 17, 2025, from EP Application No. 24222941.7, from Foreign Counterpart to U.S. Appl. No. 18/600,141, pp. 1 through 10, Published: EP.

* cited by examiner

ADAPTIVE MODAL PHASE MATCHING IN WAVEGUIDES FOR INCREASED NONLINEAR CONVERSION EFFICIENCY

STATEMENT REGARDING FEDERALLY SPONSORED RESEARCH OR DEVELOPMENT

This invention was made with Government support. The Government has certain rights in the invention.

BACKGROUND

Second order nonlinear wave mixing in waveguides is a critical process for generating light at desired wavelengths which cannot be directly produced by lasers, as well as for producing entangled photons. Efficient power conversion in waveguides for these processes depends on satisfying the phase matching conditions associated with the desired waveguide modes. In lithium niobate waveguides, (quasi) phase matching can be achieved by periodic poling through periodic polarizing gradients to the waveguide. However, periodic poling can be difficult and costly to implement when fabricating lithium niobate waveguides.

During the fabrication process, the thickness and width of the waveguide is assumed to be constant throughout the entire waveguide (unless deliberately tapered to account for desired mode conversion). But this assumption is, strictly speaking, not valid, for conventional fabrication processes create localized small-scale thickness variations in the waveguide. The spatial dimensions of the waveguide impact the phase matching conditions associated with the waveguide. Hence, a waveguide with random thickness variations will introduce localized fluctuations in the phase matching conditions necessary to generate the desired modes, and will shift the true localized phase matching condition away from the assumed constant phase matching condition. As a result, these thickness variations reduce power conversion efficiency for desired modes, and may amplify conversion of undesirable "noisy" modes in the waveguide. In some circumstances, fabrication imperfections can prevent devices implementing these waveguides from functioning properly. This problem is notably present for longer waveguides.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of any various patents, applications and publications as identified herein to provide yet further embodiments.

In one embodiment, a method for fabricating a waveguide is disclosed. The method comprises measuring localized thickness variations of at least one waveguide layer. The at least one waveguide layer comprises a second order nonlinear optical medium. The method comprises determining a correlation function for a given phase matching condition. The correlation function accounts for the measured localized thickness variations, and the given phase matching condition is based on modal phase matching between two or more modes of light propagating in the waveguide. The method comprises determining localized widths of the waveguide. The localized widths are determined from the correlation function and correspond to the measured localized thickness variations. The method comprises fabricating a width of the waveguide based on each of the localized widths.

In another embodiment, a method for fabricating an optical system is disclosed. The method comprises fabricating a waveguide by measuring localized thickness variations of at least one waveguide layer. The at least one waveguide layer comprises a second order nonlinear optical medium. The waveguide is fabricated by determining a correlation function for a given phase matching condition. The correlation function accounts for the measured localized thickness variations, and the given phase matching condition is based on modal phase matching between two or more modes of light propagating in the waveguide. The waveguide is fabricated by determining localized widths of the waveguide. The localized widths are determined from the correlation function and correspond to the measured localized thickness variations. The waveguide is fabricated by fabricating a width of the waveguide based on each of the localized widths. The method comprises coupling the waveguide to a light source. The waveguide is configured to receive light from the light source. The method comprises coupling the waveguide to an output coupler. The waveguide is configured to output light to the output coupler.

In yet another embodiment, a program product is disclosed. The program product comprises a non-transitory processor-readable medium on which program instructions configured to be executed by at least one processor are embodied. By executing the program instructions, the at least one processor is configured to receive measurements of localized thickness variations of at least one waveguide layer of a waveguide. The at least one waveguide layer comprises a second order nonlinear optical medium. The at least one processor is configured to determine a correlation function for a given phase matching condition. The correlation function accounts for the measured localized thickness variations, and the given phase matching condition is based on modal phase matching between two or more modes of light propagating in the waveguide. The at least one processor is configured to determine localized widths of the waveguide. The localized widths are determined from the correlation function and correspond to the measured localized thickness variations.

Other embodiments are also disclosed, as subsequently described.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as subsequently described and as described in conjunction with the detailed description.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, any methods presented in the figures and the specification are not to be construed as limiting the order in which the individual steps may be performed. The following detailed description is, therefore, not to be taken in a limiting sense.

Figure 1:
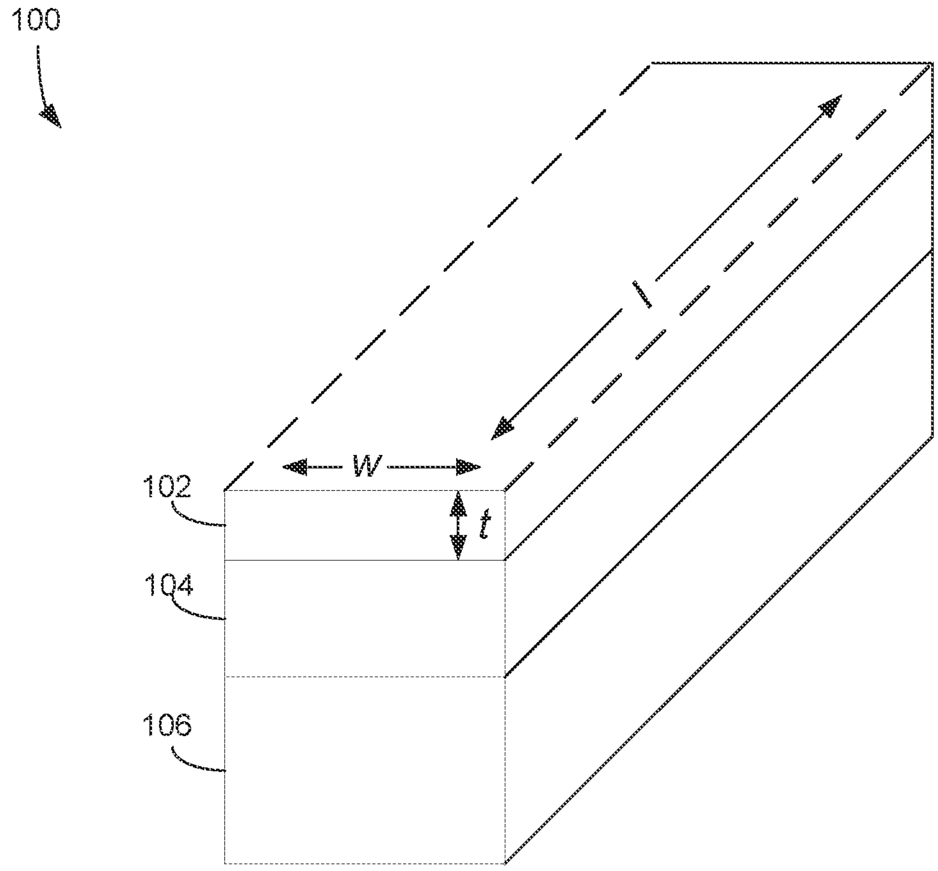
FIG. 1 depicts an isometric view of an exemplary waveguide, as described in one or more embodiments.

FIG. 1 depicts an isometric view of an exemplary waveguide 100 with which the techniques described in this disclosure will be applied to. Waveguide 100 acts as a light transport medium in which light is input into one end of the waveguide 100 and outputs at another end. A segment of waveguide 100 is shown explicitly in FIG. 1, which can extend along its length in three-dimensions both into and out of the page. For pedagogical explanation, waveguide 100 is shown as a rectangular waveguide.

In some embodiments, and as explicitly shown in FIG. 1, waveguide 100 comprises multiple layers 102, 104, 106. Each layer 102, 104, 106 can be made of a different material and serve a different function in the waveguide 100. Layer 106 is the substrate layer in which the base of the waveguide 100 is fashioned. Substrate layer 106 can be made of silicon or silicon-based material. Above the substrate layer 106 is the intermediate layer 104. This layer can be made of a silicon-based material such as silicon dioxide, and depending on the embodiment may propagate light in various modes entering from either side of the waveguide 100. Above the intermediate layer 104 is the top layer 102. Layer 102 is fashioned from a second-order nonlinear optical medium such as lithium niobate. Depending on the embodiment, layer 102 converts light from one mode to another mode entering from either side of the waveguide 100 so that light is transferred from propagating in the intermediate layer 104 to the top layer 102. Various nonlinear processes, also referred to as wave mixing processes, can occur in waveguide 102, including optical frequency conversion, optical parametric amplification, optical parametric oscillation, and spontaneous parametric down-conversion.

To generate appreciable power output in the waveguide 100 through a nonlinear process in which an input optical mode interacts with the nonlinear medium of layer 102 to produce an output optical mode through a nonlinear optical process. Tt is advantageous to arrange for the optical phases of the input and output optical modes propagating in waveguide 100 to be phase matched. While periodic poling can be used to create quasi-phase matching in waveguide 100, the optimal phase matching condition is preferably a true phase matching created using modal phase matching. Modal phase matching offers distinct advantages during the fabrication process by reducing the cost and complexity of fabricating waveguides 100 with properties to generate the desired output wavelengths from the given input wavelengths.

The spatial parameters of the waveguide 100 are characterized by its length, width, and thickness in three-dimensions. The width w is defined in FIG. 1 as the space occupied by the waveguide 100 in the horizontal axis. Its thickness t is then the space occupied in the vertical axis. Finally, the length/is the space occupied by the waveguide 100 in the third spatial axis (in and out of the page). For pedagogical explanation, the width w, thickness t, and length l are defined relative to the top layer 102, but can also be defined for the entirety of the waveguide 100, including all of its layers 102, 104, 106. During the fabrication process, the top layer 102 is constructed after fabrication of the other layers 104, 106, and the thickness t of the top layer 102 is made before the width w is finalized.

Figure 2:
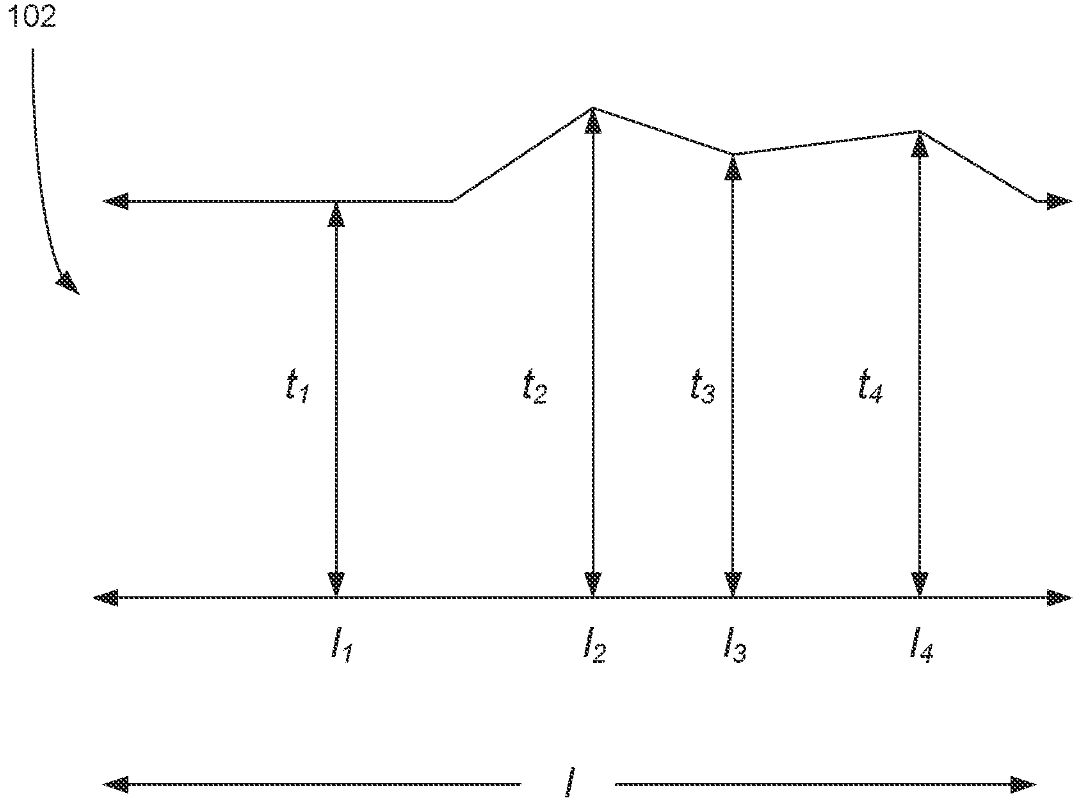
FIG. 2 depicts a side view of localized thickness variations in a waveguide, as described in one or more embodiments.

Although the waveguide 100 is depicted as perfectly rectangular in FIG. 1, in practice, intrinsic imperfections in the thickness t are present due to manufacturing imperfections of the thin film material which composes top layer 102 (see FIG. 2). That is, although not readily identifiable, there are small fluctuations on the inner and/or outer surface of the top layer 102 that render the horizontal lines defining the thickness t not "straight" as is represented in FIG. 1. These fluctuations or variations distort the local thickness of the waveguide 100 from the average thickness of the original source film from which the waveguides are fabricated. Also, these variations are localized throughout the inner and/or outer surface of the top layer 102 such that the true thickness of the waveguide 100 is no longer constant but is in fact spatially varied as a function of position (e.g., along the length/). As previously noted, these localized thickness variations may adversely impact the quality of phase matching achieved in waveguide 100 if not accounted for.

To accommodate for intrinsic variations in the thickness t of waveguide 100, the width w is adaptively tuned based on the spatially varying thickness of the second order nonlinear material layer 102. As a result, the width w of the fabricated waveguide 100 is not perfectly straight and constant, as depicted in FIG. 1, but is spatially varying along the length/of the waveguide 100 in accordance with the correlated localized thickness variations. The resulting waveguide 100 retains improved power conversion efficiency for desired modes while reducing detrimental impacts from noisy modes augmented by uncompensated thickness variations.

FIG. 2 depicts a side view of localized thickness variations in a waveguide 100. During fabrication of the thin film which comprises layer 102, these localized thickness variations are introduced into the top layer 102 such that the thickness t is not constant but is actually a spatially dependent variable. As shown in FIG. 2, four distinct thicknesses are shown along different positions of the waveguide layer 102. The first thickness is identified as $t_1$ at localized point $l_1$. Further along the length, the thickness increases to $t_2$ at localized point 2, before decreasing slightly to $t_3$ at point $l_3$. At $l_4$, the thickness again slightly increases to $t_4$. Although the four thicknesses are readily shown in FIG. 2, the variations are not necessary shown to scale and are meant to visualize the spatial variation of the thickness in the waveguide layer 102. The waveguide layer 102 thickness may deviate in other respects than the simplified depiction shown in FIG. 2. Also, the thickness can be evaluated at additional points along the waveguide layer 102 in a quasi-infinitesimal fashion.

To determine the thickness at each localized point along the waveguide layer 102, the thickness is empirically measured via reflectometry or other distance-measuring technique. Once the localized thicknesses along the waveguide layer 102 are determined, they are input into a numerical model to determine the electromagnetic properties of the waveguide 100 to satisfy the phase matching condition for the desired mode(s). As a result of the numerical analysis, the corresponding width associated with each localized thickness in the waveguide layer 102 is determined that satisfies the applicable phase matching condition. Instead of maintaining a constant width based on a constant assumed thickness, the width of the waveguide layer 102 will also be locally varying, with each localized width variation dependent on the corresponding localized thickness.

Figure 3:
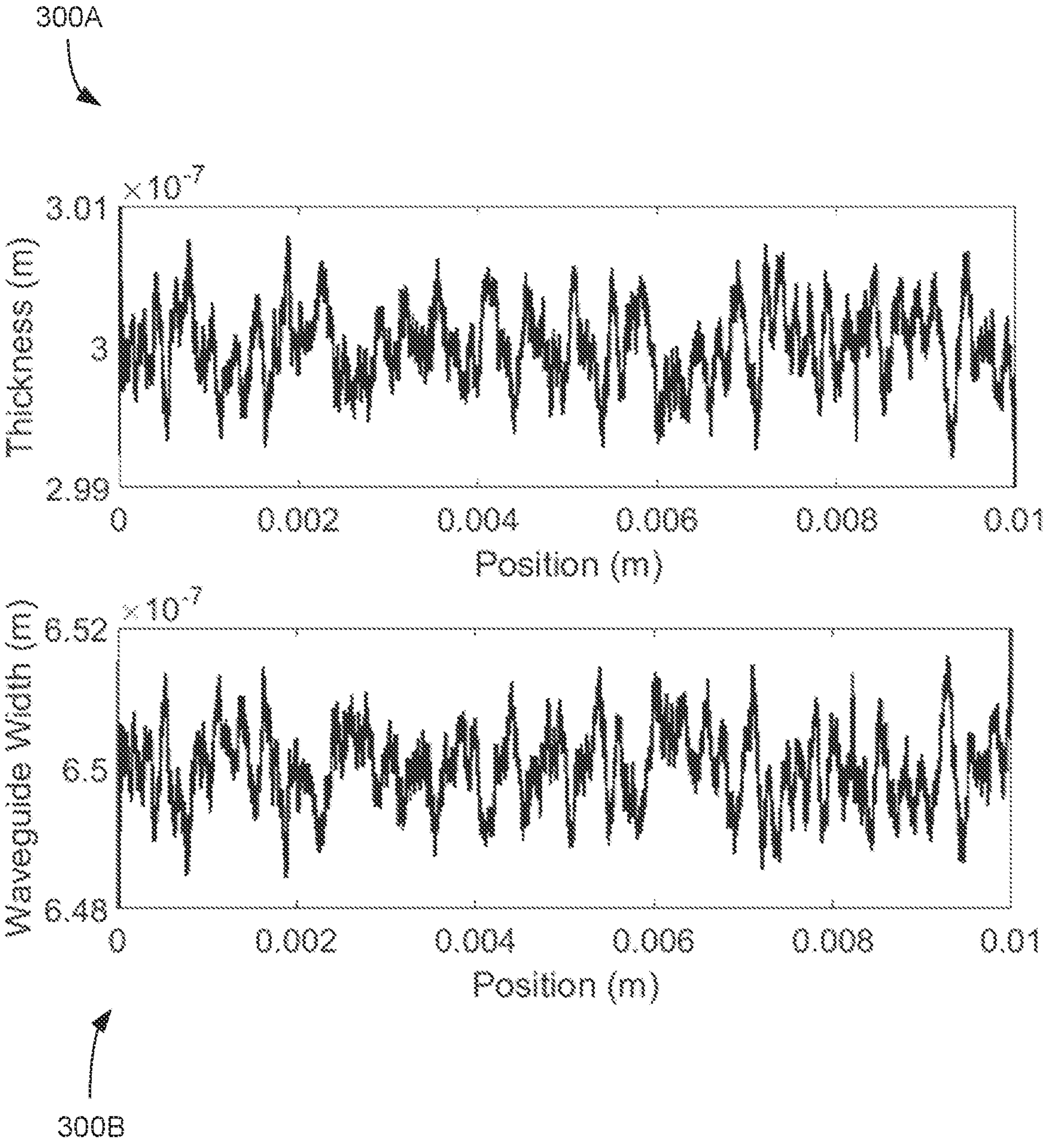
FIG. 3 depicts graphical representations of measured thickness variations and adaptive width variations of a waveguide as a function of position.

FIG. 3 depicts graphical representations of measured thickness variations and adaptive width variations of a waveguide as a function of position. In particular, two correlated graphs 300A, 300B are illustrated in FIG. 3. Graph 300A illustrates the measured thickness (vertical axis) of the waveguide 100 as a function of the position/length (horizontal axis) of the waveguide 100. Graph 300B illustrates the determined localized width (vertical axis) of the waveguide 100 at each position/length (horizontal axis).

Referring to graph 300A, the thickness is measured along the length of the waveguide 100, thereby capturing localized thickness variations. In graph 300A, the thickness fluctuates between a value of approximately 29.9 microns to 30.1 microns, or a spatially-dependent perturbation of approximately 0.2 microns to the assumed thickness of the waveguide 100. As illustrated in graph 300A, the measured thickness varies substantially over a length of 1 centimeter. Particularly for longer waveguides, fluctuating thicknesses as illustrated in graph 300A may noticeably deteriorate the total power conversion efficiency of desired modes over the entire waveguide.

Now referring to graph 300B, the width of the fabricated waveguide varies to compensate for the measured thickness variations. In some embodiments, a numerical model executed by one or more processors is used to approximate solutions to Maxwell's equations based on the spatial dimensions and other properties of the waveguide 100, including the measured thickness variations. For example, the width can be generated from finite element modeling, finite difference modeling, and other numerical schemes. Since the desired modes to be supported by the waveguide 100 are known, the output can be generated and tuned to solve for the width that achieves the desired phase-matching condition.

As a result, the width of the waveguide will also include localized width variations associated with the measured thickness variations, as shown in graph 300B. For example, referring to the correlation between graphs 300A and 300B, the corresponding width of the waveguide 100 generally increases as the localized thickness of the waveguide 100 decreases, and vise-versa. Depending on the properties of the waveguide and the desired mode, however, the width may vary in other respects relative to the measured localized thickness variations.

Figure 4:
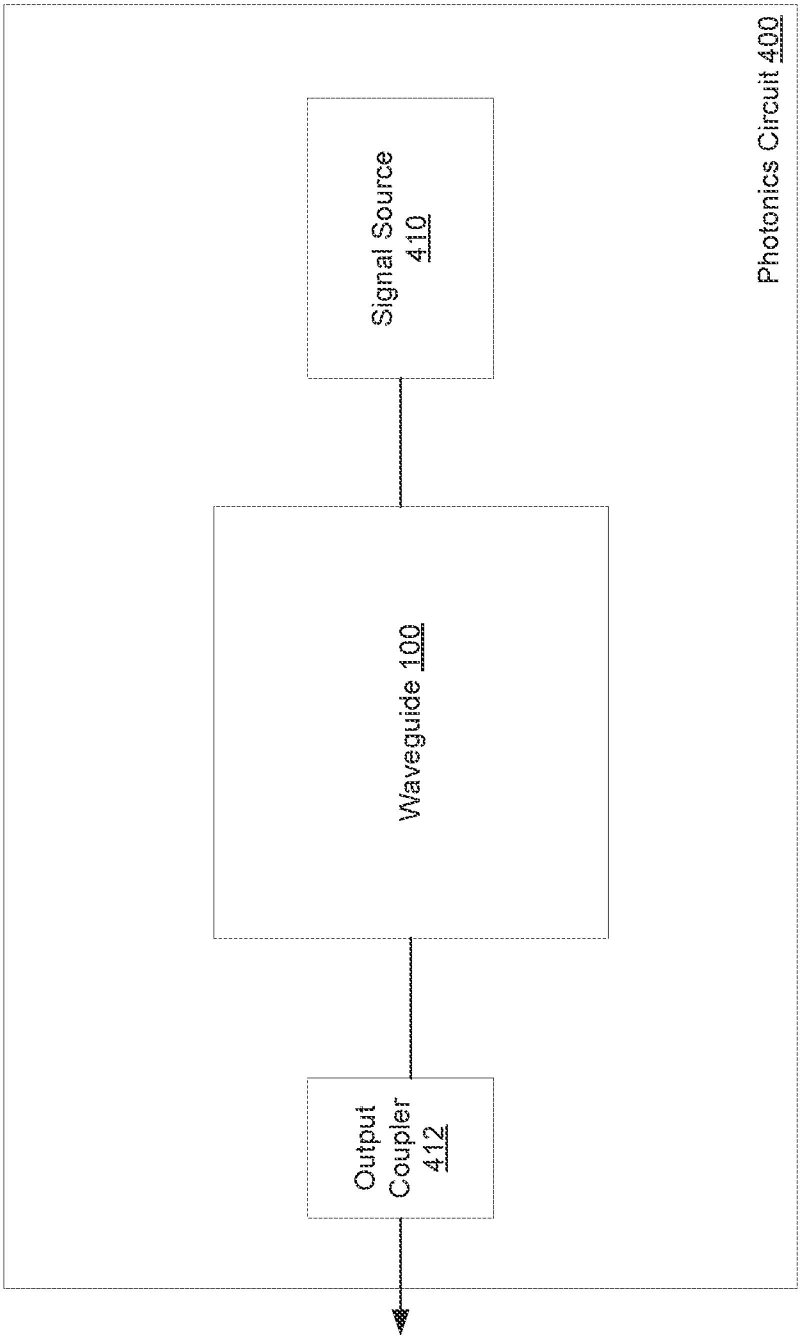
FIG. 4 depicts a block diagram of a system configured to generate and output light in accordance with the waveguides of FIGS. 1-2, as described in one or more embodiments.

FIG. 4 depicts a block diagram of an exemplary photonics circuit 400 configured to generate and output light. Photonics circuit 400 may be implemented in part or in whole on a photonics chip. Photonics circuit 400 further includes a signal source 410 and output coupler 412, which can be optically coupled by waveguides and/or free space optics.

Signal source 410 can include a signal generating device such as a laser, which is configured to transmit light through photonics circuit 400. Light generated by signal source 410 is received by waveguide 100, as described in conjunction with FIGS. 1-3, and may comprise multiple waveguide layers. Waveguide 100 converts the light to a selected mode that is phase-matched via modal phase matching techniques.

The light is then transmitted to output coupler 412. Output coupler 412 is configured to transmit the light through or out of photonics circuit 400. In some embodiments, output coupler 412 transmits the light into free space to be received by another detector e.g., a satellite or a photonics system located remotely from signal output coupler 412. In some embodiments, output coupler 412 can signal emission optics such as one or more lenses (e.g, ball lenses, gradient index (GRIN) lenses, etc.), polarizers, splitters, or other optical components. In some embodiments, the light output from output coupler 412 is utilized in conjunction with other optical functions, such as spectral filtering or mode conversion.

Figure 5:
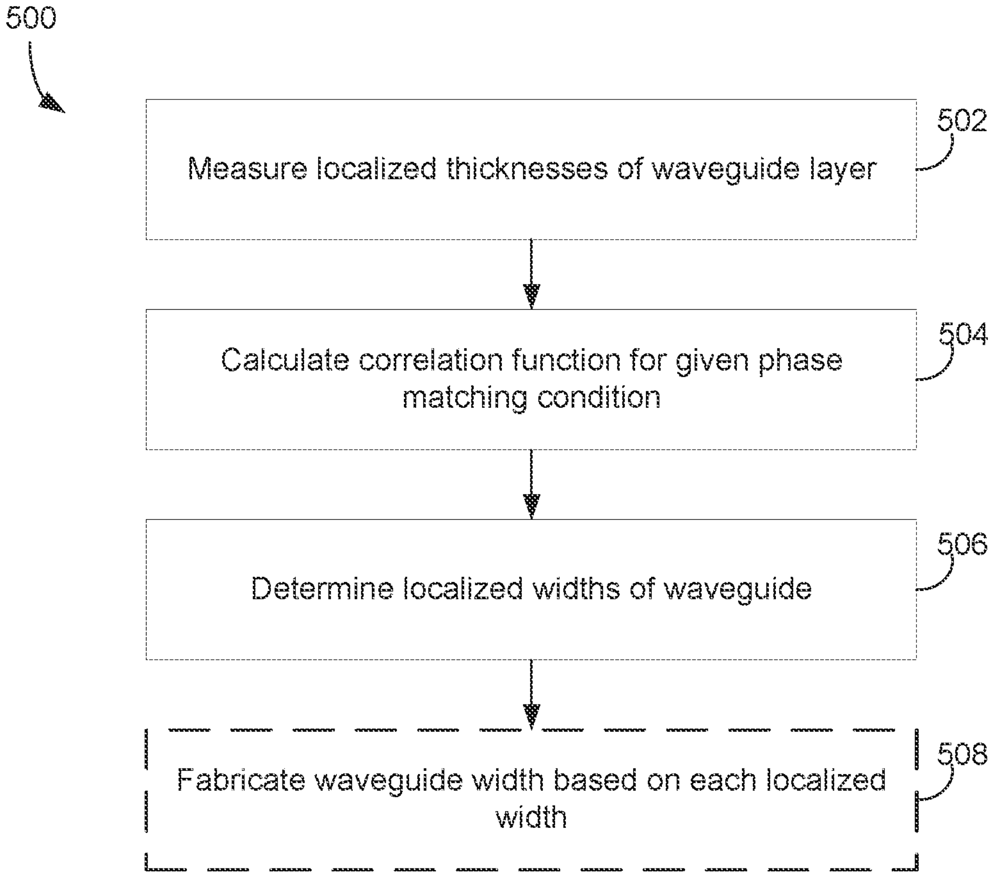
FIG. 5 depicts a flow diagram of a method for compensating for measured localized thickness variations of a waveguide, as described in one or more embodiments.

FIG. 5 depicts a flow diagram of a method 500 for compensating for measured localized thickness variations of a waveguide. Method 500 may be implemented via the techniques described with respect to FIGS. 1-4, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 500 includes measuring the localized thicknesses of the waveguide at block 502. In one example, the second order nonlinear optical medium of top layer 102 is deposited on an optical substrate with relatively constant thickness. However, even for the best fabrication techniques, there will be localized thickness fluctuations of the top layer 102. Therefore, using high precision reflectometry or other distance measuring technique, local thickness variations in the waveguide layer are observed.

Proceeding to block 504, method 500 calculates the correlation function for a given phase matching condition. In some embodiments, the correlation function is a transfer function that is determined by finite element modeling or other numerical approximation technique to solve for the electromagnetic field distribution in the waveguide. Once the correlation function is determined, method 500 then determines the localized widths of the waveguide that correspond to the measured localized thickness fluctuations at block 506. For example, the width variation of the waveguide can be determined by the correlation of the localized thickness fluctuations for the given modal phase matching condition from the transfer function. Blocks 502-506 can be performed by one or more processors. In performing method 500, the extent of thickness fluctuations can be compensated for during fabrication to maintain a desired phase matching condition.

Additionally, method 500 optionally includes fabricating the width of the waveguide at block 508 based on each localized width determined from block 506. This step can be performed utilizing suitable fabrication techniques such as waveguide etching that are sensitive enough to implement the width variations determined at block 506. Block 508 is identified as optional since the fabrication of the waveguide can be performed independently of the processing and modeling involved in characterizing the waveguide, and may be performed by separate entities.

The methods and techniques described herein may be implemented in part in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes a method for fabricating a waveguide, comprising: measuring localized thickness variations of at least one waveguide layer, wherein the at least one waveguide layer comprises a second order nonlinear optical medium; determining a correlation function for a given phase matching condition, wherein the correlation function accounts for the measured localized thickness variations, and the given phase matching condition is based on modal phase matching between two or more modes of light propagating in the waveguide; determining localized widths of the waveguide, wherein the localized widths are determined from the correlation function and correspond to the measured localized thickness variations; and fabricating a width of the waveguide based on each of the localized widths.

Example 2 includes the method of Example 1, wherein the fabricated waveguide achieves the given phase matching condition.

Example 3 includes the method of any of Examples 1-2, wherein the localized widths of the waveguide comprise localized width variations.

Example 4 includes the method of any of Examples 1-3, wherein as the measured localized thickness variation decreases in thickness, the corresponding localized width increases, wherein as the measured localized thickness variation increases in thickness, the corresponding localized width decreases.

Example 5 includes the method of any of Examples 1-4, wherein by fabricating the width of the waveguide, the given phase matching condition remains satisfied along a length of the waveguide in accordance with the measured localized thickness variations.

Example 6 includes the method of any of Examples 1-5, wherein the correlation function is a transfer function between the localized thickness variations of the at least one waveguide layer and the determined localized widths of the waveguide.

Example 7 includes the method of Example 6, wherein the transfer function is generated from a finite element model.

Example 8 includes a method for fabricating an optical system, comprising: fabricating a waveguide by: measuring localized thickness variations of at least one waveguide layer, wherein the at least one waveguide layer comprises a second order nonlinear optical medium; determining a correlation function for a given phase matching condition, wherein the correlation function accounts for the measured localized thickness variations, and the given phase matching condition is based on modal phase matching between two or more modes of light propagating in the waveguide; determining localized widths of the waveguide, wherein the localized widths are determined from the correlation function and correspond to the measured localized thickness variations; and fabricating a width of the waveguide based on each of the localized widths; coupling the waveguide to a light source, wherein the waveguide is configured to receive light from the light source; and coupling the waveguide to an output coupler, wherein the waveguide is configured to output light to the output coupler.

Example 9 includes the method of Example 8, wherein the light source is configured to generate light at a first mode to the waveguide, wherein the waveguide is configured to convert the light at the first mode to a second mode, and to output light at the second mode to the output coupler.

Example 10 includes the method of any of Examples 8-9, wherein the waveguide, the light source, and the output coupler are implemented on a photonics circuit.

Example 11 includes the method of any of Examples 8-10, wherein as the measured localized thickness variation decreases in thickness, the corresponding localized width increases, wherein as the measured localized thickness variation increases in thickness, the corresponding localized width decreases.

Example 12 includes the method of any of Examples 8-11, wherein by fabricating the width of the waveguide, the given phase matching condition remains satisfied along a length of the waveguide in accordance with the measured localized thickness variations.

Example 13 includes the method of any of Examples 8-12, wherein the correlation function is a transfer function between the localized thickness variations of the at least one waveguide layer and the determined localized widths of the waveguide.

Example 14 includes the method of Example 13, wherein the transfer function is generated from a finite element model.

Example 15 includes a program product comprising a non-transitory processor-readable medium on which program instructions configured to be executed by at least one processor are embodied, wherein by executing the program instructions, the at least one processor is configured to: receive measurements of localized thickness variations of at least one waveguide layer of a waveguide, wherein the at least one waveguide layer comprises a second order nonlinear optical medium; determine a correlation function for a given phase matching condition, wherein the correlation function accounts for the measured localized thickness variations, and the given phase matching condition is based on modal phase matching between two or more modes of light propagating in the waveguide; and determine localized widths of the waveguide, wherein the localized widths are determined from the correlation function and correspond to the measured localized thickness variations.

Example 16 includes the program product of Example 15, wherein as the measured localized thickness variation decreases in thickness, the corresponding localized width increases, wherein as the measured localized thickness variation increases in thickness, the corresponding localized width decreases.

Example 17 includes the program product of any of Examples 15-16, wherein the correlation function is a transfer function between the localized thickness variations of the at least one waveguide layer and the determined localized widths of the waveguide.

Example 18 includes the program product of Example 17, wherein the transfer function is generated from a finite element model.

Example 19 includes the program product of any of Examples 15-18, wherein the received measurements of localized thickness variations correspond to measurements received from a reflectometer.

Example 20 includes the program product of any of Examples 15-19, wherein the at least one processor provides control signals based on the localized widths to a fabrication system for fabricating the waveguide.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for fabricating a waveguide, comprising:

measuring localized thickness variations of at least one waveguide layer, wherein the at least one waveguide layer comprises a second order nonlinear optical medium;

determining localized widths of the waveguide, wherein the localized widths are determined from a correlation function and correspond to the measured localized thickness variations; and fabricating a width of the waveguide based on each of the localized widths;

wherein the correlation function is for a given phase matching condition and is for a transfer function between the localized thickness variations of the at least one waveguide layer and the localized widths of the waveguide, solving for electromagnetic field distribution in the waveguide;

wherein the given phase matching condition is based on modal phase matching between two or more modes of light propagating in the waveguide.

2. The method of claim 1, wherein the fabricated waveguide achieves the given phase matching condition.

3. The method of claim 1, wherein the localized widths of the waveguide comprise localized width variations.

4. The method of claim 1, wherein as the measured localized thickness variation decreases in thickness, the corresponding localized width increases, wherein as the measured localized thickness variation increases in thickness, the corresponding localized width decreases.

5. The method of claim 1, wherein by fabricating the width of the waveguide, the given phase matching condition remains satisfied along a length of the waveguide in accordance with the measured localized thickness variations.

6. The method of claim 1, wherein the transfer function is generated from a finite element model.

7. A method for fabricating an optical system, comprising:

fabricating a waveguide by:

measuring localized thickness variations of at least one waveguide layer, wherein the at least one waveguide layer comprises a second order nonlinear optical medium;

determining localized widths of the waveguide, wherein the localized widths are determined from a correlation function and correspond to the measured localized thickness variations; and fabricating a width of the waveguide based on each of the localized widths;

wherein the correlation function is for a given phase matching condition and is for a transfer function between the localized thickness variations of the at least one waveguide layer and the localized widths of the waveguide, solving for electromagnetic field distribution in the waveguide;

wherein the given phase matching condition is based on modal phase matching between two or more modes of light propagating in the waveguide;

coupling the waveguide to a light source, wherein the waveguide is configured to receive light from the light source; and coupling the waveguide to an output coupler, wherein the waveguide is configured to output light to the output coupler.

8. The method of claim 7, wherein the light source is configured to generate light at a first mode to the waveguide, wherein the waveguide is configured to convert the light at the first mode to a second mode, and to output light at the second mode to the output coupler.

9. The method of claim 7, wherein the waveguide, the light source, and the output coupler are implemented on a photonics circuit.

10. The method of claim 7, wherein as the measured localized thickness variation decreases in thickness, the corresponding localized width increases, wherein as the measured localized thickness variation increases in thickness, the corresponding localized width decreases.

11. The method of claim 7, wherein by fabricating the width of the waveguide, the given phase matching condition remains satisfied along a length of the waveguide in accordance with the measured localized thickness variations.

12. The method of claim 7, wherein the transfer function is generated from a finite element model.

13. A program product comprising a non-transitory processor-readable medium on which program instructions configured to be executed by at least one processor are embodied, wherein by executing the program instructions, the at least one processor is configured to:

receive measurements of localized thickness variations of at least one waveguide layer of a waveguide, wherein the at least one waveguide layer comprises a second order nonlinear optical medium;

determine localized widths of the waveguide, wherein the localized widths are determined from a correlation function and correspond to the measured localized thickness variations;

wherein the correlation function is for a given phase matching condition and is for a transfer function between the localized thickness variations of the at least one waveguide layer and the localized widths of the waveguide, solving for electromagnetic field distribution in the waveguide;

wherein the given phase matching condition is based on modal phase matching between two or more modes of light propagating in the waveguide.

14. The program product of claim 13, wherein as the measured localized thickness variation decreases in thickness, the corresponding localized width increases, wherein as the measured localized thickness variation increases in thickness, the corresponding localized width decreases.

15. The program product of claim 13, wherein the transfer function is generated from a finite element model.

16. The program product of claim 13, wherein the received measurements of localized thickness variations correspond to measurements received from a reflectometer.

17. The program product of claim 13, wherein the at least one processor provides control signals based on the localized widths to a fabrication system for fabricating the waveguide.

* * * * *